(12) United States Patent
Iijima

(10) Patent No.: US 6,914,652 B2
(45) Date of Patent: Jul. 5, 2005

(54) LIQUID CRYSTAL DISPLAY DEVICE, METHOD FOR PRODUCING THE LIQUID CRYSTAL DISPLAY DEVICE, AND ELECTRONIC APPARATUS

(75) Inventor: Chiyoaki Iijima, Ina (JP)

(73) Assignee: Seiko Epson Corporation, Tokyo (JP)

( * ) Notice: Subject to any disclaimer, the term of this patent is extended or adjusted under 35 U.S.C. 154(b) by 29 days.

(21) Appl. No.: 10/435,021

(22) Filed: May 12, 2003

(65) Prior Publication Data

US 2003/0227589 A1 Dec. 11, 2003

(30) Foreign Application Priority Data

May 15, 2002 (JP) ........................................ 2002-140648

(51) Int. Cl.[7] ............................................. G02F 1/1335
(52) U.S. Cl. ...................... 349/114; 349/114; 349/123; 349/96
(58) Field of Search ............................ 349/96, 114, 123

(56) References Cited

U.S. PATENT DOCUMENTS 6,320,629 B1 * 11/2001 Hatano et al. ................ 349/15
6,335,773 B1 * 1/2002 Kamei et al. ................. 349/96
6,686,980 B1 * 2/2004 Ichihashi ..................... 349/96

FOREIGN PATENT DOCUMENTS

| JP | A 2001-91747 | 4/2001 |
| JP | A 2002-277636 | 9/2002 |
| WO | WO 99/08140 | 2/1999 |

* cited by examiner

*Primary Examiner*—Robert H. Kim
*Assistant Examiner*—(Nancy) Thanh-Nhan P Nguyen
(74) *Attorney, Agent, or Firm*—Oliff & Berridge, PLC (57) ABSTRACT

The invention provides a transflective liquid crystal display device which can provide a display with good visibility, and a method of producing the same. A method of producing a liquid crystal display device in which a step of forming an inner polarizing layer of a transflective liquid crystal panel to perform a displaying operation in a transmission mode and a reflection mode includes making the direction of extension of openings, or through holes, formed in a reflective layer to reflect incident light and the direction of exerting stress to apply a material of the inner polarizing layer are the same when the material of the inner polarizing layer is applied while exerting a stress thereupon.

10 Claims, 8 Drawing Sheets

LIQUID CRYSTAL DISPLAY DEVICE, METHOD FOR PRODUCING THE LIQUID CRYSTAL DISPLAY DEVICE, AND ELECTRONIC APPARATUS

BACKGROUND OF THE INVENTION

1. Field of Invention

The present invention relates to a liquid crystal display device and a method of producing the liquid crystal display device. More particularly, the invention relates to a transflective liquid crystal display device capable of providing a sufficiently bright display even in a transmission mode, and a method of producing the transflective liquid crystal display device.

2. Description of Related Art

The related art includes a transflective liquid crystal display device which functions in both a reflection mode to display an image using external light, such as natural light or illumination light, and a transmission mode to display an image using an illuminator, such as a backlight, as a light source. One type of such a transflective liquid crystal display device performs a displaying operation in the transmission mode by transmitting light from the backlight through a though hole. The through hole to transmit light is formed in a portion of a reflective layer, disposed at the inner side or the outer side of a liquid crystal panel and used to reflect external light.

SUMMARY OF THE INVENTION

In the related art transflective liquid crystal display device, when an image is displayed in the reflection mode, light incident upon the liquid crystal panel is reflected by the reflective layer and is transmitted through a liquid crystal layer twice while the light exits towards the outside. Therefore, by reflecting circularly polarized light by the reflective layer and reversing the direction of rotation of its polarization axis, switching between pixels is carried out. In this structure, in order to perform bright and dark displaying operations in the transmission mode, it is necessary for light incident upon the liquid crystal layer from a lower substrate to be circularly polarized light. As a result, light incident upon a polarizer at the side of an upper substrate becomes circularly polarized light or linearly polarized light, so that, when the bright displaying operation is carried out, a portion (approximately half) of the incident circularly polarized light is transmitted to display an image. In this way, since the light incident upon the liquid crystal layer in the transmission mode is used with low efficiency, sufficient luminance cannot be provided in the transmission mode.

The present invention addresses or solves the above and/or other problems, and provides a liquid crystal display device which can provide a bright display in the transmission mode. The invention also provides a method of producing the liquid crystal display device.

In order to address or overcome the problem of the transflective liquid crystal display device that a sufficient display luminance cannot be provided in the transmission mode, a liquid crystal display device can be provided that includes a polarizing layer which is disposed on the entire inner side of a substrate of a liquid crystal panel and which has a function that is equivalent to the function of a polarizer.

Figure 8:
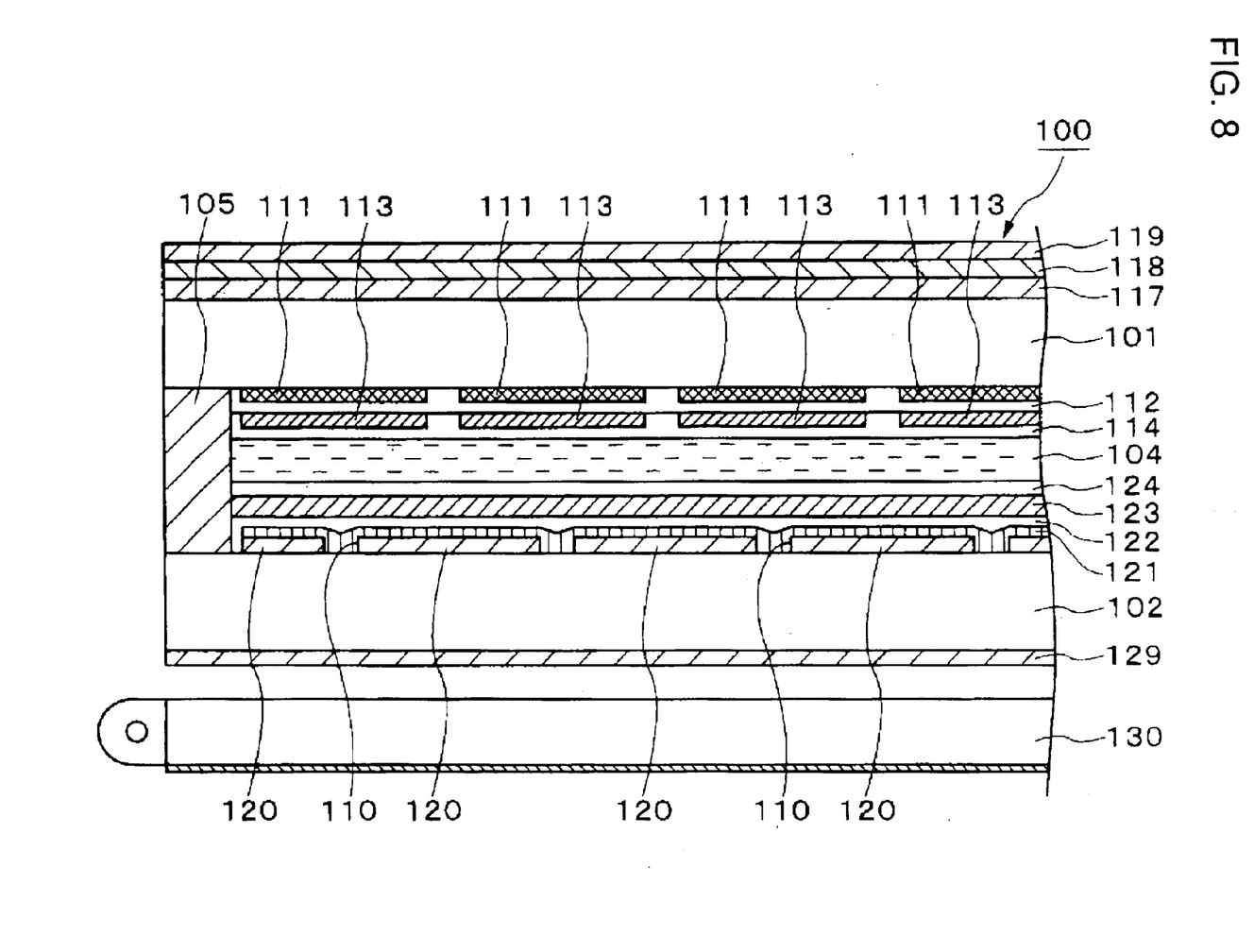
FIG. 8 is a partial sectional view of a liquid crystal display device including a polarizing layer at the inner surface of a substrate.

FIG. 8 is a sectional view of the structure of this type of transflective liquid crystal display device, which includes a liquid crystal panel 100 and a backlight (illuminator) 130. In the liquid crystal panel 100, a liquid crystal layer 104 is interposed between opposing upper and lower substrates 101 and 102 and sealed in by a sealant 105. The backlight 130 is disposed at the rear side (lower side in FIG. 8) of the liquid crystal panel 100.

Color filter layers 111, a planarizing layer 112, a plurality of electrodes 113 disposed in the form of stripes in plan view, and an alignment layer 114 are disposed at the inner side (the side of the liquid crystal layer 104) of the upper substrate 101 of the liquid crystal panel 100. A front diffuser 117, a retardation film 118, and a polarizer 119 are stacked upon each other in that order at the outer side (upper side in FIG. 8) of the upper substrate 101.

On the other hand, a reflective layer 120, a polarizing layer 121, a planarizing layer 122, a plurality of electrodes 123 disposed in the form of stripes in plan view, and an alignment layer 124 are disposed at the inner side (the side of the liquid crystal layer 104) of the lower substrate 102 of the liquid crystal panel 100. A polarizer 129 is disposed at the outer side of the lower substrate 102. The direction of extension of the electrodes 123 at the lower substrate 102 is perpendicular to the direction of extension of the electrodes 113 at the upper substrate 101. Through holes 110 are formed in portions of the reflective layer 120. Light from the backlight 130 is incident upon the liquid crystal layer 104 through the through holes 110.

Figure 9:
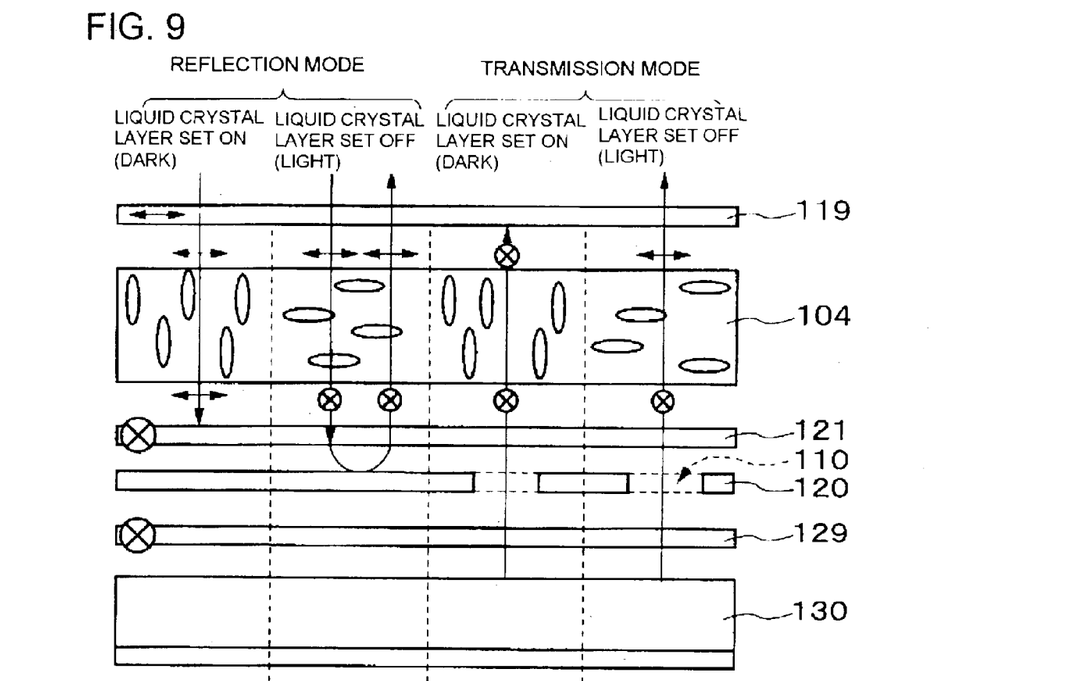
FIG. 9 is a schematic that illustrates the principle of operation of the liquid crystal display device shown in FIG. 8.

FIG. 9 is a schematic that illustrates the principle of display of the transflective liquid crystal display device having the above-described structure, and only shows a significant portion of the liquid crystal display device shown in FIG. 8. In FIG. 9, displaying operations in the reflection mode are illustrated on the left, whereas displaying operations in the transmission mode are illustrated on the right.

As shown in FIG. 9, in the liquid crystal display device shown in FIG. 8, when a voltage is applied to the liquid crystal layer 104 (when the liquid crystal layer 104 is set in an on state), dots are displayed darkly in both the reflection and transmission modes. In contrast, when a voltage is not applied to the liquid crystal layer 104 (when the liquid crystal layer 104 is set in an off state), dots are displayed brightly in both the reflection and transmission modes.

In the reflection mode, as shown on the left side in FIG. 9, external light incident upon the liquid crystal panel 100 is converted into linearly polarized light that is parallel to the sheet plane of FIG. 9 by the polarizer 119 having a polarization axis that is parallel to the sheet plane of FIG. 9 and impinges upon the liquid crystal layer 104. Here, when the liquid crystal layer 104 is set in an on state, the light that has impinged upon the liquid crystal layer 104 is incident upon the polarizing layer 121 as linearly polarized light parallel to the sheet plane of FIG. 9 and is absorbed by the polarizing layer 121 having a polarization axis perpendicular to the sheet plane of FIG. 9. Therefore, the dots are darkly displayed. In contrast, when the liquid crystal layer 104 is set in an off state, the light that has impinged upon the liquid crystal layer 104 is converted into linearly polarized light that is perpendicular to the sheet plane of FIG. 9 by the action of the liquid crystal layer 104. The converted light impinges upon and is transmitted through the polarizing layer 121. Then, the light is reflected by the reflective layer 120, is transmitted through the polarizing layer 121 again, and impinges upon the liquid crystal layer 104. Thereafter, the light is converted into linearly polarized light parallel to the sheet plane of FIG. 9 by the action of the liquid crystal layer 104, is transmitted through the polarizer 119, and exits away from the upper substrate 101. In this way, dots are brightly displayed.

In the transmission mode, as shown on the right side in FIG. 9, light from the backlight 130 is converted into linearly polarized light that is perpendicular to the sheet plane of FIG. 9 by the polarizer 129. Then, the light transmits through the through holes 110 of the reflective layer 120, impinges upon and is transmitted through the polarizing layer 121 having a polarization axis perpendicular to the sheet plane of FIG. 9, and impinges upon the liquid crystal layer 104. Here, when the liquid crystal layer 104 is set in an on state, the light impinges upon the polarizer 119 at the upper substrate 101 as linearly polarized light perpendicular to the sheet plane of FIG. 9 without being subjected to the action of the liquid crystal layer 104, and is absorbed by the polarizer 119 having a polarization axis that is parallel to the sheet plane of FIG. 9, so that dots are darkly displayed. In contrast, when the liquid crystal layer 104 is set in an off state, the incident light is converted into linearly polarized light parallel to the sheet plane of FIG. 9 by the action of the liquid crystal layer 104, and impinges upon the polarizer 119. Then, the light is transmitted through the polarizer 119 and exits therefrom, so that dots are brightly displayed.

Accordingly, in the liquid crystal display device shown in FIG. 8 having the polarizing layer 121 disposed at the inner sides of the substrates 101 and 102, the light incident upon the polarizer 119 from the liquid crystal layer 104 is linearly polarized light when a bright display is provided in the transmission mode. Therefore, there is almost no light absorbed by the polarizer 119. Consequently, the liquid crystal display device makes it possible to address or overcome the problem of the luminance being insufficient in the transmission mode, which is a problem in related art transflective liquid crystal display devices, and can provide a bright display.

In the liquid crystal display device shown in FIG. 8, since, structurally speaking, the light incident upon the liquid crystal layer 104 can be maximally used for a display operation, the display luminance in the transmission mode may be made up to approximately twice that of related art liquid crystal display devices. However, the display luminance in the transmission mode cannot be actually made up to approximately twice that of related art liquid crystal display devices. Therefore, there are still differences between the display luminances in the transmission and reflection modes.

In order to address or overcome the problem of the luminance being insufficient in the transmission mode in the transflective liquid crystal display device having the structure shown in FIG. 8, the inventor repeatedly conducted research, and discovered that the insufficient luminance is caused by the polarization function in a transmissive display area of the polarizing layer 121 (the level area of the through holes 110 of the reflective layer 120) at the inner side of the liquid crystal panel 100 being less than the polarization function in its reflective display area (the area where the reflective layer 120 is provided). In other words, the light incident upon the through holes 110 from the backlight 130 is attenuated by the polarizing layer 121, so that, in the transmission mode, the light source is used with lower efficiency. As a result, sufficient luminance cannot be provided.

Figure 10:
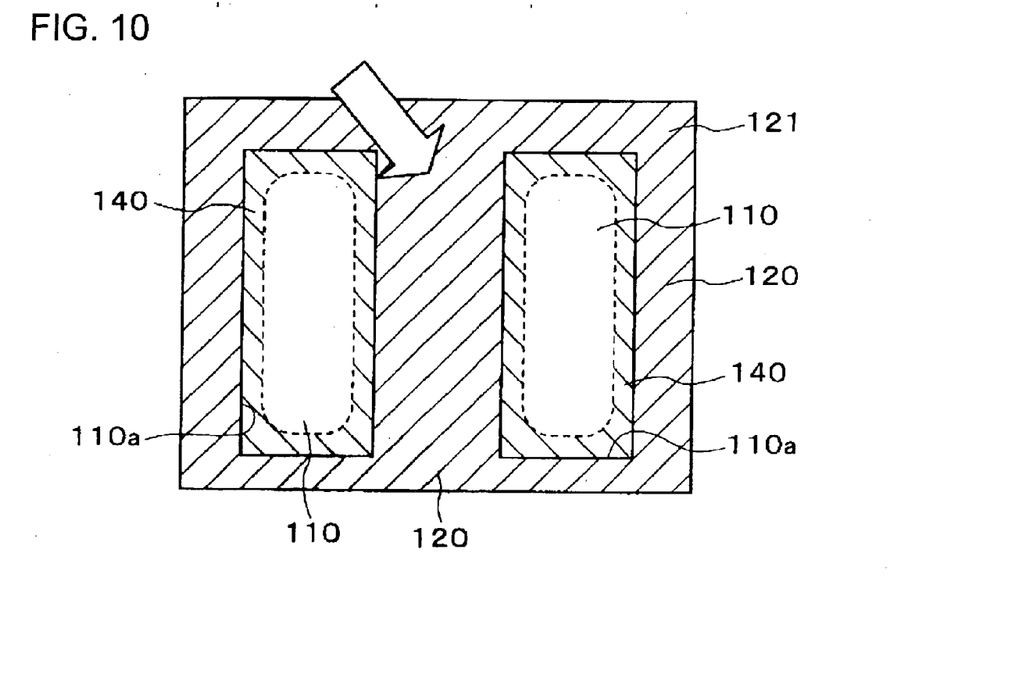
FIG. 10 is a schematic plan view of the polarizing layer in the liquid crystal display device shown in FIG. 8.
Figure 11:
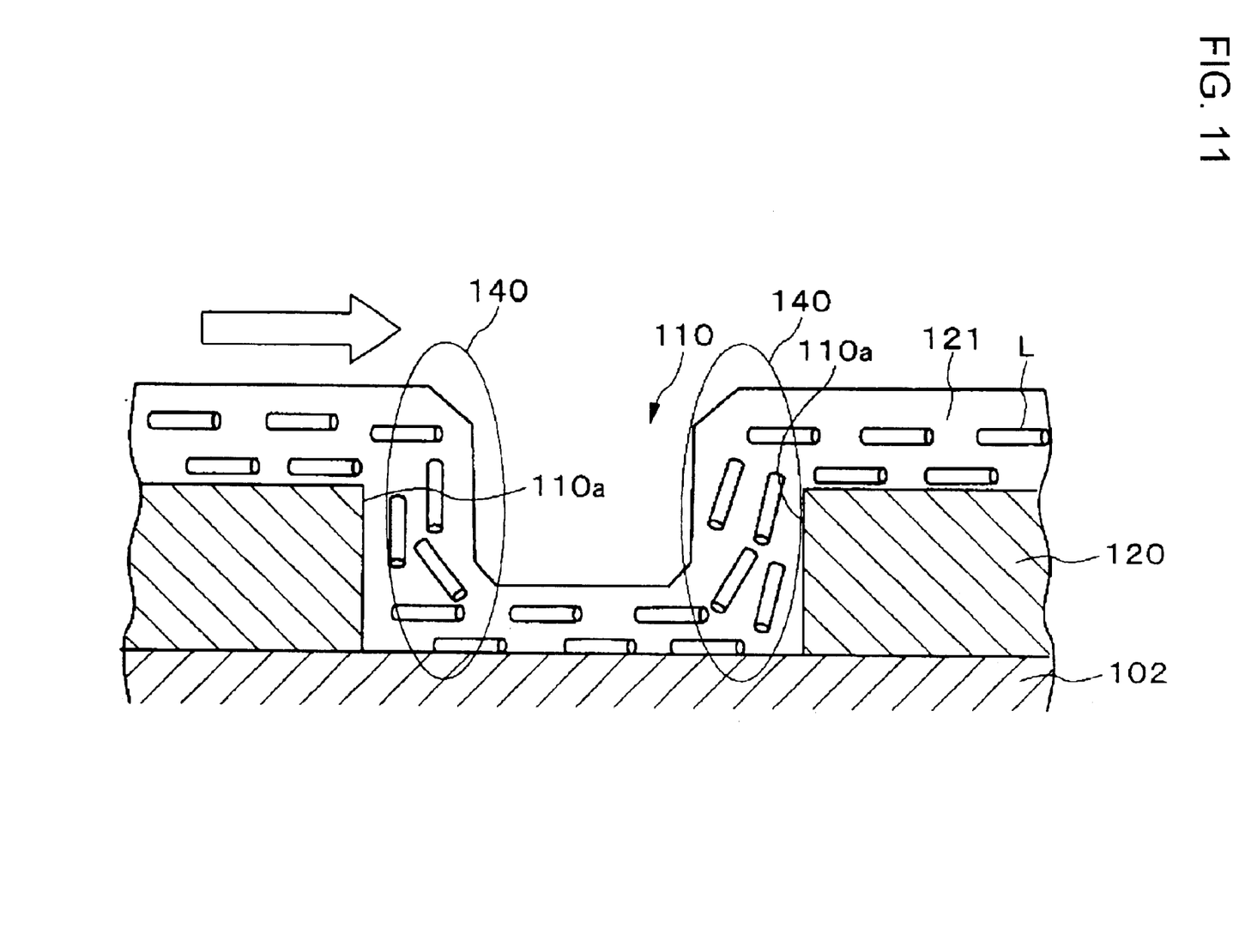
FIG. 11 is a partial schematic sectional view of a reflective layer and the polarizing layer in the liquid crystal display device shown in FIG. 8.

The polarization function of portions of the polarizing layer 121 at the through holes 110 of the reflective layer 120 is reduced due to the method of forming the polarizing layer 121. FIGS. 10 and 11 illustrate alignment states of liquid crystal molecules in a portion of the polarizing layer 121 in the reflective layer 120 and in a portion of the polarizing layer 121 on the top portion of the reflective layer 120. The parts required to illustrate the alignment states of the liquid crystal molecules of the polarizing layer 121 are only shown. FIG. 10 is a partial plan view of these parts, and FIG. 11 is a partial sectional view of these parts. In FIGS. 10 and 11, parts common to ones shown in FIG. 8 are given the same reference numerals. As shown in FIG. 10, the polarizing layer 121 is formed by applying what are called lyotropic liquid crystals (an aqueous solution of a liquid crystal material including, for example, water-soluble dichromatic dye) to the reflective layer 120 and letting it dry and harden. In order to determine the direction of the polarization axis of the polarizing layer 121, the polarizing layer 121 is formed by stretching the material while exerting stress thereupon in one direction as indicated by the arrow shown in FIG. 10. When this method is used, the liquid crystals are properly aligned on the level reflective layer, so that good polarization properties can be provided. However, as shown in FIG. 11, unaligned portions 140 where liquid crystal molecules L of the polarizing layer 121 are not aligned are formed at steps 110a formed by the reflective layer 120 and the through hole 110. The unaligned portions 140 give rise to differences between the polarization functions in the polarizing layer 121. In particular, the polarization function at the steps 110a at the peripheries of the inner sides of the through holes is reduced. Therefore, the light entering the through hole 110 from the lower substrate 102 is attenuated.

To address or overcome the problem of the polarization function being reduced in the transmission display area, according to one aspect of the present invention, there is provided a method of producing a liquid crystal display device that includes a liquid crystal layer disposed between a pair of opposing substrates, a transmissive display area, and a reflective display area, a reflective layer being disposed at the reflective display area and having an opening which transmits light and which defines the transmissive display area. The method includes forming the reflective layer having the opening on one of the pair of substrates; and forming an inner polarizing layer which covers the reflective layer and the opening. In the forming of the inner polarizing layer, a material of the inner polarizing layer is applied while exerting a stress thereupon in one direction, the direction of exerting the stress being substantially the same as the direction of extension of the opening of the reflective layer.

The inner polarizing layer produced by the method of the present invention is such that the direction in which stress is exerted during the application thereof is substantially the same as the direction of extension of the opening defined by a step formed by the opening and the reflective layer, so that the fraction of a portion at the step that extends in a direction intersecting the direction in which the stress is exerted is reduced, so that nonalignment in the material of the inner polarizing layer can be reduced or minimized. This makes it less likely for a reduction in the property of the inner polarizing layer caused by the non-alignment to occur, so that a light source can be used with higher efficiency. Therefore, a liquid crystal display device that provides a bright transmissive display can be provided.

According to another aspect of the present invention, there is provided a method of producing a liquid crystal display device comprising a liquid crystal layer disposed between a pair of opposing substrates, a transmissive display area, and a reflective display area, a reflective layer being disposed at the reflective display area and having an opening which transmits light and which defines the transmissive display area. The method includes forming the reflective layer having the opening on one of the pair of substrates;

forming an alignment layer for an inner polarizing layer, the alignment layer covering the reflective layer and the opening; and forming the inner polarizing layer on the alignment layer. In the forming of the alignment layer, the alignment layer is formed so as to cover the reflective layer and the opening and is aligned, the direction of performing the alignment operation being substantially the same as the direction of extension of the opening of the reflective layer in order to apply the inner polarizing layer to the alignment layer.

According to this method of the present invention, in forming an inner polarizing layer, an alignment layer for the inner polarizing layer aligned in the same direction as the direction of extension of the opening of the reflective layer is first formed. Then, the inner polarizing layer is formed on the alignment layer for the polarizing layer. Therefore, by interposing the alignment layer for the inner polarizing layer between the reflective layer and the inner polarizing layer, the degree of non-alignment in a portion of the inner polarizing layer at the opening of the reflective layer can be reduced. In addition, since the alignment layer for the polarizing layer is aligned in the same direction as the direction of extension of the opening of the reflective layer, alignment properties at the boundary between a step and a level portion of the reflective layer do not change, so that the alignment layer for the inner polarizing layer has acceptable alignment properties. Further, since the inner polarizing layer is formed on the alignment layer having acceptable alignment properties, the degree of non-alignment in the inner polarizing layer can be further reduced. As a result, it is possible to reduce attenuation of light in the inner polarizing layer, so that a light source can be used with greater efficiency. Therefore, it is possible to provide a liquid crystal display device that provides a bright transmissive display.

According to still another aspect of the present invention, there is provided a method of producing a liquid crystal display device that includes a liquid crystal layer disposed between a pair of opposing substrates. The method includes forming a stripe-shaped electrode on one of the pair of substrates, the electrode being used to apply a voltage to the liquid crystal layer, and forming an inner polarizing layer which covers the electrode. In the forming of the inner polarizing layer, a material of the inner polarizing layer is applied while exerting a stress thereupon in one direction, the direction of exerting the stress being substantially the same as the direction of extension of the electrode.

According to the method of producing a liquid crystal display device of the present invention, by making the direction of extension of the stripe-shaped electrode and the direction of exerting stress upon the inner polarizing layer the same, the percentage of a portion at a step, which corresponds to an edge of the electrode, extending in a direction intersecting the direction of exerting stress is reduced, so that the degree of non-alignment in the material of the inner polarizing layer due to the step at the electrode can be reduced. As a result, attenuation of light in the inner polarizing layer can be reduced, thereby making it possible to provide a liquid crystal display device which can provide a display with high luminance. In this structure, the reflective layer in the present invention is not a necessary structural element, so that the present invention is effective not only in a transflective liquid crystal display device, but also in a transmissive liquid crystal display device.

According to still another aspect of the present invention, there is provided a method of producing a liquid crystal display device that includes a liquid crystal layer disposed between a pair of opposing substrates. The method includes forming a stripe-shaped electrode on one of the pair of substrates, the electrode being used to apply a voltage to the liquid crystal layer; forming an alignment layer for an inner polarizing layer, the alignment layer covering the electrode; and forming the inner polarizing layer on the alignment layer. In the forming of the alignment layer, the alignment layer is formed so as to cover the electrode and aligned, the direction of performing the alignment operation being substantially the same as the direction of extension of the electrode in order to apply the inner polarizing layer to the alignment layer.

According to the method of producing a liquid crystal display device of the present invention, prior to forming an inner polarizing layer, an alignment layer for the inner polarizing layer aligned in the same direction as the direction of extension of the stripe-shaped electrode is formed, so that it is possible to prevent the alignment properties of the inner polarizing layer from becoming degraded due to the step at the electrode. Therefore, an inner polarizing layer having good alignment properties can be formed. As a result, it is possible to provide a liquid crystal display device which can provide a high-quality display.

According to still another aspect of the present invention, there is provided a liquid crystal display device that includes a liquid crystal layer disposed between a pair of opposing substrates; a transmissive display area; and a reflective display area. At one of the pair of substrates, a reflective layer is disposed at the reflective display area and has an opening which transmits light and which defines the transmissive display area. The liquid crystal display device also includes an inner polarizing layer which covers the reflective layer and the opening and which is formed of a material including or consisting essentially of a water-soluble dichromatic dye. An alignment direction in the inner polarizing layer is substantially the same as the direction of extension of the opening of the reflective layer.

According to still another aspect of the present invention, there is provided a liquid crystal display device that includes a liquid crystal layer disposed between a pair of opposing substrates; a transmissive display area; and a reflective display area. At one of the pair of substrates, a reflective layer is disposed at the reflective display area and has an opening which transmits light and which defines the transmissive display area. The liquid crystal display device further includes an alignment layer for an inner polarizing layer, the alignment layer covering the reflective layer and the opening; and the inner polarizing layer formed of a material including or consisting essentially of polymer liquid crystals. The alignment layer and the inner polarizing layer are successively stacked upon each other. The direction of performing an alignment operation on the alignment layer and the direction of extension of the opening of the reflective layer are substantially the same.

According to still another aspect of the present invention, there is provided a liquid crystal display device that includes a liquid crystal layer disposed between a pair of opposing substrates; a striped-shaped electrode, disposed on one of the pair of substrates, to apply a voltage to the liquid crystal layer; a transmissive display area; a reflective display area; and an inner polarizing layer formed of a material including or consisting essentially of a water-soluble dichromatic dye. An alignment direction in the inner polarizing layer and the direction of extension of the electrode are substantially the same.

According to still another aspect of the present invention, there is provided a liquid crystal display device that includes a liquid crystal layer disposed between a pair of opposing substrates; a striped-shaped electrode, disposed on one of the pair of substrates, to apply a voltage to the liquid crystal layer; a transmissive display area; a reflective display area; an alignment layer for an inner polarizing layer; and the inner polarizing layer formed of a material including or consisting essentially of polymer liquid crystals. The alignment layer and the inner polarizing layer are successively stacked on the electrode. The direction of performing an alignment operation on the alignment layer and the direction of extension of the electrode are substantially the same.

The liquid crystal display device of the present invention is produced by any one of the aforementioned methods of producing a liquid crystal display device. According to this structure, since the alignment properties of the material of the inner polarizing layer are not degraded by a step at an underlying layer, the liquid crystal display device includes an inner polarizing layer having good polarization properties. When the liquid crystal display device includes such an inner polarizing layer having good polarization properties, it provides a bright transmissive display and has excellent visibility.

DETAILED DESCRIPTION OF PREFERRED EMBODIMENTS

A description of an exemplary embodiment of the present invention is provided below with reference to the relevant drawings.

Figure 1:
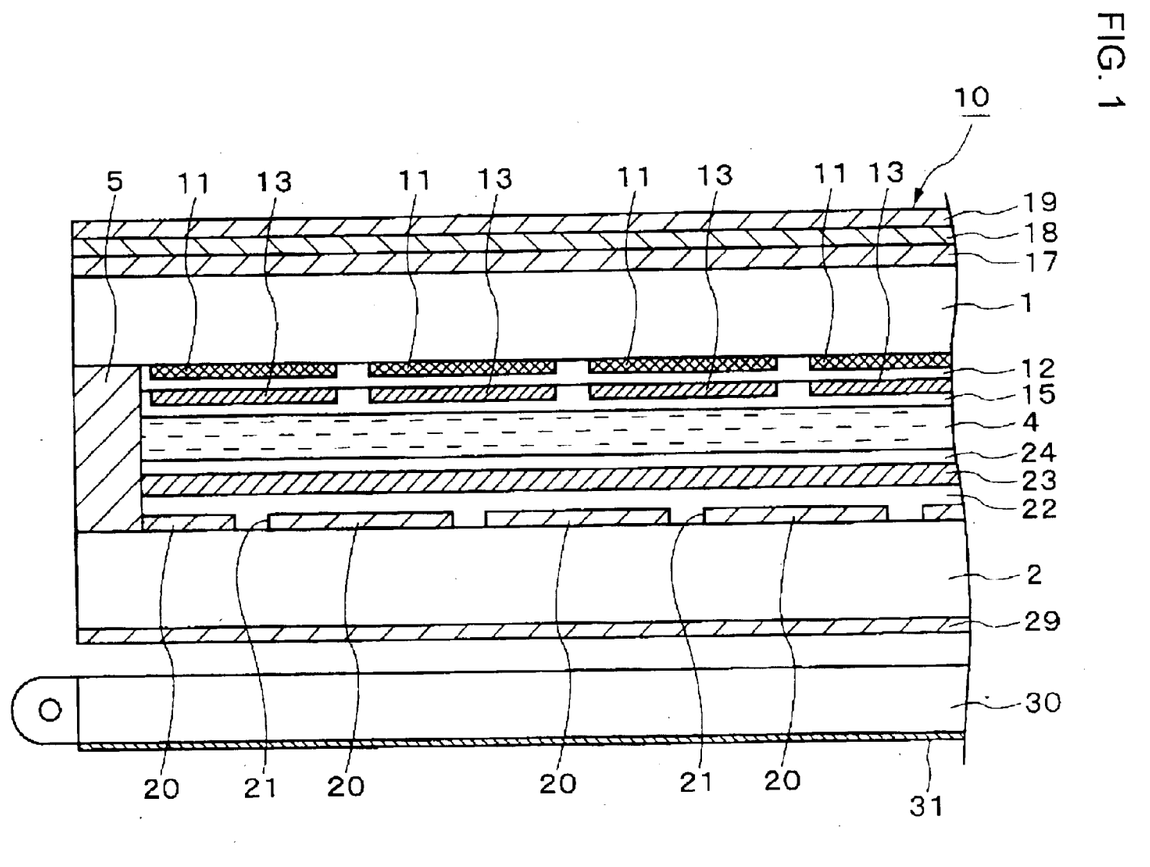
FIG. 1 is a partial sectional view of the structure of a liquid crystal display device of an exemplary embodiment of the present invention.

FIG. 1 is a partial sectional view of the structure of an exemplary embodiment of a liquid crystal display device produced by a method of producing a liquid crystal display device of the present invention.

The liquid crystal display device shown in FIG. 1 generally includes a liquid crystal panel 10 and a backlight (illuminator) 30 disposed at the rear side (lower side in FIG. 1) of the liquid crystal panel 10. In the exemplary embodiment, the case where the present invention is applied to a passive matrix transflective liquid crystal display device is described. In order to make it easier to view the figures that are referred to below, the elements are illustrated with different film thicknesses, dimensions, etc., as appropriate.

In the liquid crystal panel 10, an upper substrate 1 and a lower substrate 2 are disposed so as to oppose each other, and a liquid crystal layer 4 is interposed between the substrates 1 and 2 and sealed in by a sealant 5.

A plurality of color filters 11, a planarizing layer 12, a plurality of electrodes 13, and an alignment layer 15 are formed at the inner side (liquid crystal layer 4 side) of the upper substrate 1. The plurality of color filters 11 are arranged and formed in a matrix in plan view. The planarizing layer 12 is formed so as to cover the color filters 11. The plurality of electrodes 13 are formed of transparent electrically conductive materials, such as indium tin oxide (ITO), and are disposed on the planarizing layer 12 in the form of stripes in plan view. The alignment layer 15 is formed so as to cover the electrodes 13. A front diffuser 17, a retardation film 18, and a polarizer 19 are stacked upon each other at the outer side of the upper substrate 1.

A reflective layer 20, openings 21, an inner polarizing layer 22, a plurality of electrodes 23, and an alignment layer 24 are formed at the inner side (liquid crystal layer 4 side) of the lower substrate 2. The reflective layer 20 is a thin metal layer having high reflectivity such as an Al or Ag layer. The openings 21 are formed in the reflective layer to pass transmission light from the backlight 30 (described later). The inner polarizing layer 22 is formed so as to cover the reflective layer 20 and the openings 21. The electrodes 23 are formed of transparent electrically conductive materials, such as ITO, and are disposed in the form of stripes in plan view on the inner polarizing layer 22. The alignment layer 24 is formed so as to cover the electrodes 23. A polarizer 29 is disposed on the outer surface of the lower substrate 2.

A reflective layer 31, which is a metal layer having high reflectivity such as an Al layer or an Ag layer, is disposed on the outer surface (that is, the side opposite to the liquid crystal panel 10) of the backlight 30.

Figure 2:
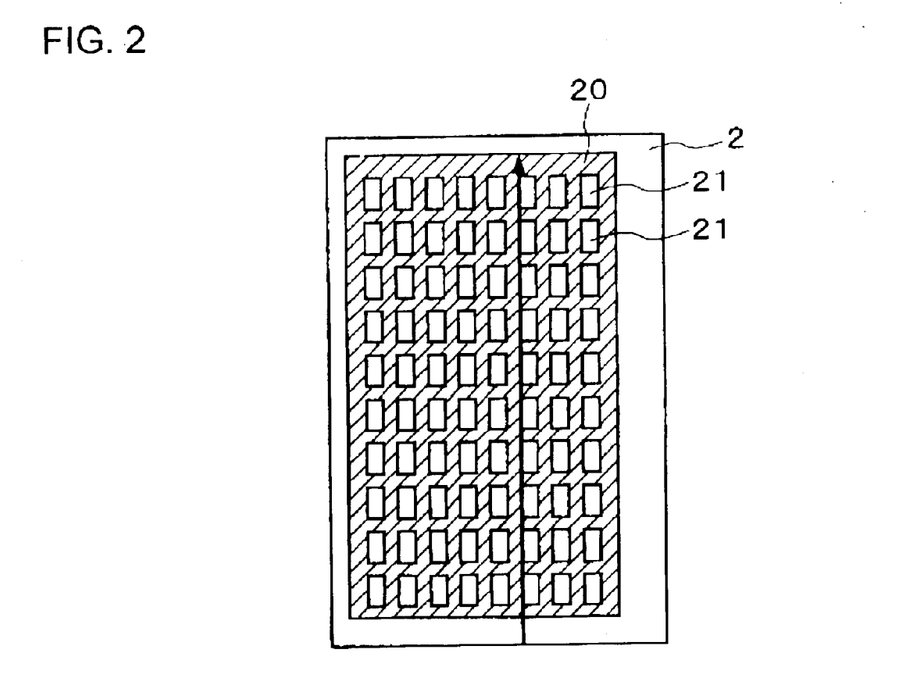
FIG. 2 is a schematic plan view of a reflective layer of the liquid crystal display device shown in FIG. 1.

FIG. 2 is a schematic plan view of a surface of the reflective layer 20 of the liquid crystal panel 10 shown in FIG. 1. The openings 21 pass through the reflective layer 20 formed on the lower substrate 2. Light from the backlight 30 can pass through the openings 21. Although, in the exemplary embodiment, each opening 21 is rectangular, each opening 21 in the liquid crystal display device of the present invention is not limited thereto and may have other shapes such as stripe shapes or elliptical shapes. The inner polarizing layer 22 is formed on the reflective layer 20 having the openings 21 so as to cover them. The direction of alignment of liquid crystals of the inner polarizing layer 22 is the same as the direction of the long sides of each rectangular shape of each opening 21, that is, the direction of extension of each opening 21. This direction is indicated by the arrow shown in FIG. 2.

The material of the inner polarizing layer 22 is not particularly limited as long as it polarizes transmission light without attenuating it. However, it is desirable that the material is formed of the material including or consisting essentially of water-soluble liquid crystals because of its polarization properties and easiness of production. For example, a material consisting essentially of lyotropic liquid crystals (produced by OPTIVA and disclosed in International Publication No. WO99/08140). This material is a liquid crystal material which becomes a lyotropic liquid crystal material when it is in an aqueous state. In applying the liquid crystal material as an aqueous solution to the reflective layer 20, when the liquid crystal material is spread on the openings 21 and the reflective layer 20 while exerting a stress thereupon, an inner polarizing layer 22 having a polarization axis in a predetermined direction can be formed with a predetermined thickness. In addition, when applying the liquid crystal material, by making the direction of exerting stress the same as the direction of extension of the openings 21, liquid crystal molecules can be aligned in one direction. In other words, by making drops of the liquid crystal solution fall onto the reflective layer 20 and moving a Meyer rod (wire bar) or the like at a predetermined speed in the direction of extension of the openings 21, the liquid crystal aqueous solution can be applied while exerting stress thereupon in a constant direction, so that the inner polarizing layer 22 having a predetermined polarization axis can be produced.

Figure 3:
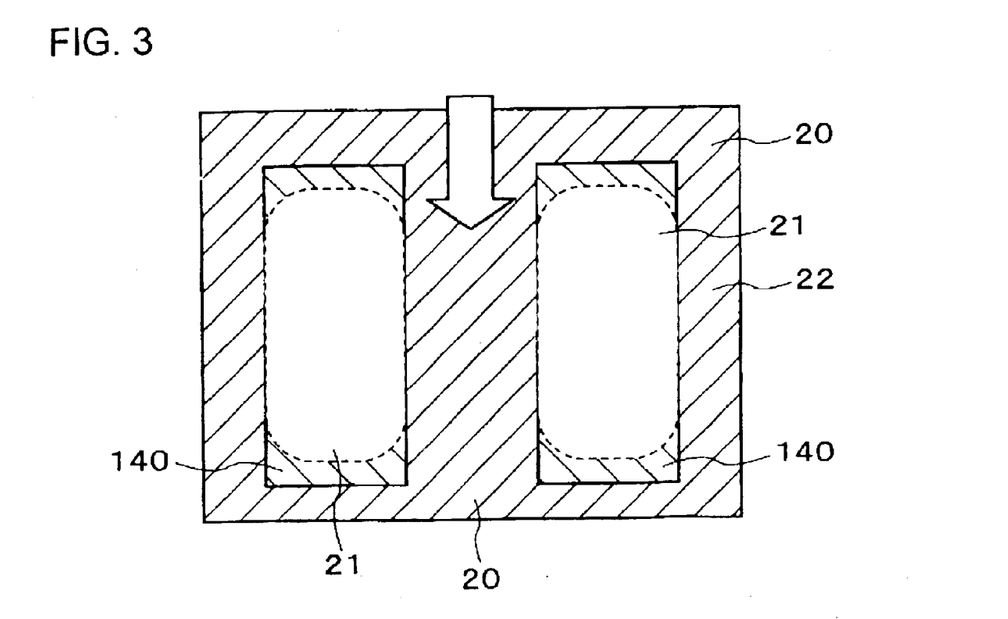
FIG. 3 is a schematic plan view of an inner polarizing layer of the liquid crystal display device shown in FIG. 1.

As shown in FIG. 3, since the inner polarizing layer 22 formed in this way is formed of a liquid crystal material whose molecules are aligned in the same direction as the direction of extension of the openings 21, unaligned portions 140 in which the molecules of the liquid crystal material are out of alignment at steps formed by the reflective layer 20 and the openings 21 exist in an inclined manner only at the peripheral portions of the steps at the short sides of the openings 21, so that the areas of the unaligned portions 140 are considerably smaller than those in the related art. Therefore, not only can the polarization properties of the entire inner polarizing layer 22 be enhanced, but also attenuation of transmission light can be reduced, so that the display luminance in a transmission mode can be increased.

A liquid crystal material including or consisting essentially of thermotropic polymer liquid crystals containing dichromatic dye may also be used as the material of the inner polarizing layer 22. In this case, an alignment layer for the inner polarizing layer is formed so as to cover the reflective layer 20 and the openings 21, and is rubbed in a predetermined direction. Then, the thermotropic polymer liquid crystal material containing dichromatic dye is applied to the alignment layer for the inner polarizing layer, is heated to make it isotropic, cooled to rearrange the liquid crystal molecules, and hardened by, for example, photopolymerization. By this, the inner polarizing layer 22 can be formed. The alignment layer for the inner polarizing layer may be a polymer material layer, formed of, for example, polyimide, that has been subjected to a predetermined rubbing operation (alignment operation).

By interposing the alignment layer for the inner polarizing layer between the reflective layer 20 and the inner polarizing layer 22, not only are the unaligned portions 140 of the inner polarizing layer 22 less often produced, but also the alignment properties of the inner polarizing layer 22 can be further enhanced, so that a high-quality display can be provided.

In order to increase adherence between the reflective layer 20 and the inner polarizing layer 22, for example, an adherence layer (formed of a silane coupling agent, $SiO_2$, or the like) may be interposed. When such an adherence layer is provided, the adherence between the reflective layer 20 and the inner polarizing layer 22 is increased, so that double refraction and non-alignment at the boundary of these layers occur less frequently.

Figure 4:
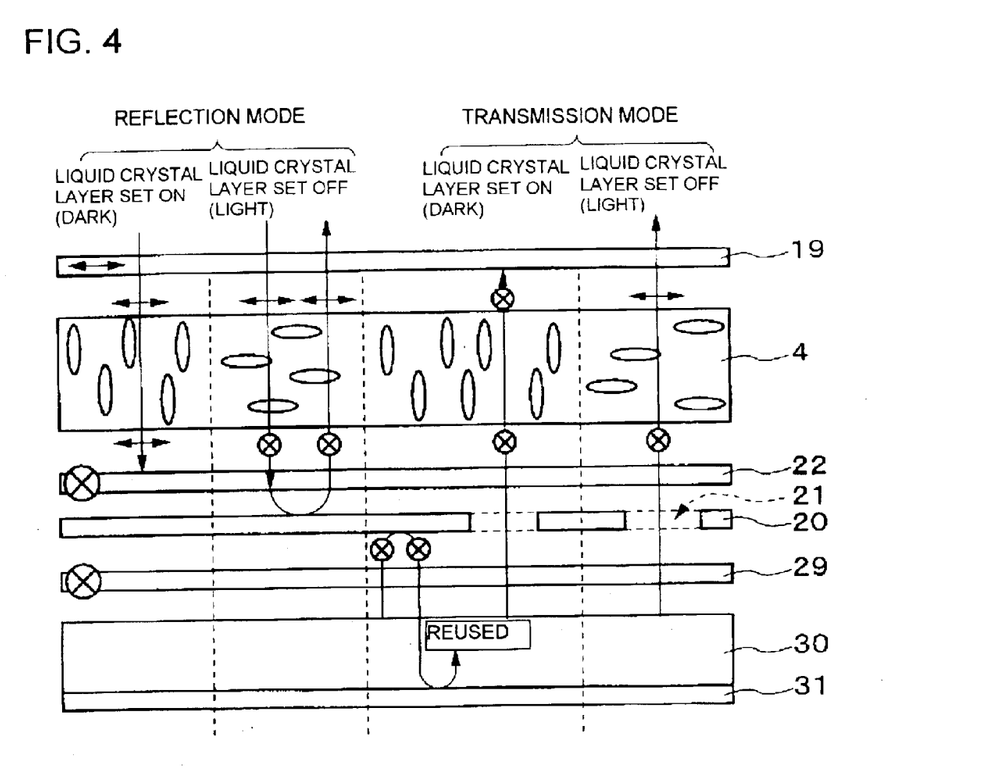
FIG. 4 is a schematic that illustrates the principle of operation of the liquid crystal display device shown in FIG. 1.

A description of the principle of operation of the liquid crystal display device having the above-described structure is provided below. FIG. 4 illustrates the principle of operation of the liquid crystal display device, and shows only the main portion of the liquid crystal display device shown in FIG. 1. In FIG. 4, operations in a reflection mode are illustrated on the left side, whereas operations in the transmission mode are illustrated on the right sides. In the description below, when a voltage is applied to the liquid crystal layer 4 (that is, when it is set in an on state), the liquid crystal molecules are aligned substantially perpendicular to the direction of the surfaces of the upper substrate 1 and the lower substrate 2, whereas, when a voltage is not applied to the liquid crystal layer 4 (that is, when it is set in an off state), the liquid crystal molecules are aligned substantially parallel to the direction of the surfaces of the upper substrate 1 and the lower substrate 2. Therefore, when the liquid crystal layer 4 is in an on state, light incident upon the liquid crystal layer 4 is transmitted through the liquid crystal layer 4 almost without being subjected to the action of the liquid crystal layer 4, whereas, when the liquid crystal layer 4 is in an off state, the light incident upon the liquid crystal layer 4 is transmitted through the liquid crystal layer 4 while being subjected to the action of the liquid crystal layer 4. The action of the liquid crystal layer 4 refers to polarization conversion action including optical rotation and double refraction of polarized light incident upon the liquid crystal layer.

In the reflection mode, external light incident upon the liquid crystal panel 10 is converted into linearly polarized light parallel to the sheet plane of FIG. 4 by the polarizer 19 having a polarization axis parallel to the sheet plane of FIG. 4, and impinges upon the liquid crystal layer 4. Here, when the liquid crystal layer 4 is set in an on state, the light that has impinged upon the liquid crystal layer 4 is incident upon the inner polarizing layer 22 as linearly polarized light parallel to the sheet plane of FIG. 4 and is absorbed by the inner polarizing layer 22 having a polarization axis perpendicular to the sheet plane of FIG. 4. Therefore, dots are darkly displayed. In contrast, when the liquid crystal layer 4 is in an off state, the incident light is converted into linearly polarized light perpendicular to the sheet plane of FIG. 4 by optical rotation by the liquid crystal layer 4, impinges upon the inner polarizing layer 22, is transmitted through the inner polarizing layer 22 having a polarization axis perpendicular to the sheet plane of FIG. 4, and impinges upon the reflective layer 20. Then, the light is reflected by the reflective layer 20, is re-transmitted through the inner polarizing layer 22, and impinges upon the liquid crystal layer 4 from the side of the lower substrate 2. At this time, since the liquid crystal layer 4 is in an off state, the light transmitted through the liquid crystal layer 4 is linearly polarized light parallel to the sheet plane of FIG. 4 due to the optical rotation by the liquid crystal layer 4. Thereafter, the light is transmitted through the polarizer 19 having a polarization axis parallel to the sheet plane of FIG. 4 and exits therefrom, so that dots are brightly displayed.

In the transmission mode, as shown on the right side of FIG. 4, light from the backlight 30 is converted into linearly polarized light perpendicular to the sheet plane of FIG. 4 by the polarizer 29. Then, the converted light passes through the openings 21 (which are through holes formed in the reflective layer 20) and the inner polarizing layer 22, and impinges upon the liquid crystal layer 4. Here, when the liquid crystal layer 4 is in an on state, the incident light impinges upon the polarizer 19 at the upper substrate 1 as linearly polarized light perpendicular to the sheet plane of FIG. 4 without being subjected to the action of the liquid crystal layer 4, and is absorbed by the polarizer 19 having a polarization axis parallel to the sheet plane of FIG. 4, so that dots are darkly displayed. In contrast, when the liquid crystal layer 4 is in an off state, the incident light is converted into linearly polarized light parallel to the sheet plane of FIG. 4 by the action of the liquid crystal layer 4, and impinges upon the polarizer 19. Then, the light is transmitted through the polarizer 19 and exits therefrom, so that dots are brightly displayed.

Light reflected by the outer side (that is, the lower substrate 2 side) of the reflective layer 20 after being emitted from the backlight 30 and transmitted through the polarizer 29 is linearly polarized light perpendicular to the sheet plane of FIG. 4 due to the action of the polarizer 29, so that the light is transmitted through the polarizer 29 and impinges upon the backlight 30 again. Then, the light is reflected by the reflective layer 31 provided on the outer surface of the backlight 30, and travels towards the liquid crystal panel 10 again. In this way, the light reflected by the outer surface of the reflective layer 20 is repeatedly reflected between the reflective layer 20 and the reflective layer 31 at the backlight 30. As the light is repeatedly reflected, it impinges upon the openings 21 of the reflective layer 20, and is used for display. Therefore, in the liquid crystal display device of the exemplary embodiment, almost all of the light from the backlight 30 can be used for a display operation in the transmission mode, so that the light source is used with greater efficiency. Therefore, a bright display can be provided.

Since the inner polarizing layer 22 used in the present invention is aligned in the same direction as the direction of extension of the openings 21 of the reflective layer 20, the production of unaligned portions by the steps at the openings 21 can be reduced or minimized, so that attenuation of light can be reduced. Therefore, it is possible to provide a bright display in the transmission mode, as a result of which a liquid crystal display device having excellent visibility can be provided.

Although the liquid crystal display device of this exemplary embodiment of the present invention is described taking a passive matrix liquid crystal display device as an example, the present invention is not limited to the above-described structure. Therefore, as long as the liquid crystal display device is a transflective liquid crystal display device having openings, which are through holes, in the reflective layer, the present invention may be applied to any type of liquid crystal display device regardless of the method of driving the liquid crystals. For example, the present invention may also be applied to an active matrix liquid crystal display device without any problem.

Figure 5:
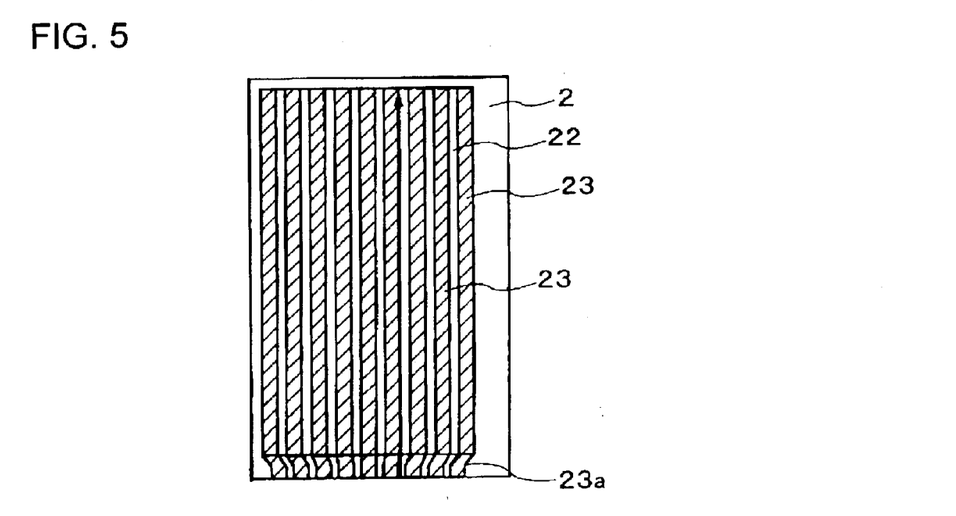
FIG. 5 is a schematic plan view of electrodes of the liquid crystal display device shown in FIG. 1.

FIG. 5 is a schematic plan view showing another example of the inner polarizing layer 22 in the present invention, which is used in the liquid crystal panel 10 shown in FIG. 1. The inner polarizing layer 22 shown in FIG. 5 is formed on the electrodes 23 formed with stripe shapes above the lower substrate 2, and is applied to the electrodes 23 while applying stress thereupon in the same direction as the direction of extension of the electrodes 23, that is, in the same direction as the direction of the arrow in FIG. 5. According to the method of forming the inner polarizing layer 22 of the present invention, even if an underlying portion for forming the inner polarizing layer 22 is not level, by making the direction of extension of the steps at the underlying portion and the direction of application of the inner polarizing layer 22 the same, non-alignment in the material of the inner polarizing layer 22 at areas near the steps can be reduced or minimized. By this, it is possible for the inner polarizing layer 22 to have good polarization properties with little attenuation of light. Here, each electrode 23 has a terminal 23a. Although there are portions of the terminals 23a that do not extend in the same direction as the direction of application of the inner polarizing layer 22, these portions are eventually removed from the inner polarizing layer 22 or disposed outside the display area, so that non-alignment in these portions do not affect the displaying operation. In the example shown in FIG. 5, an alignment layer for the inner polarizing layer may be interposed between the electrodes 23 and the inner polarizing layer 22. By such a structure, it is possible to further enhance the alignment properties of the material of the inner polarizing layer 22. In order to increase adherence between the electrodes 23 and the inner polarizing layer 22, for example, an adherence layer (formed of a silane coupling agent, $SiO_2$, or the like) may be interposed therebetween.

Hereunder, methods for producing the liquid crystal display device of the present invention will be described with reference to the relevant drawings. In the exemplary embodiment, two types of methods including different production steps and structures are described below. In the production methods described below, only the step of forming an inner polarizing layer at the inner surface of the lower substrate, which is a distinctive feature of the present invention, is described in detail. A detailed description of the steps of forming electrodes and an alignment layer on a lower substrate and the step of forming an upper substrate are not provided. These parts may be formed by steps of a related method of producing a liquid crystal panel.

The liquid crystal display devices that are produced by these production methods have optically equivalent functions. If a reflective layer having through holes is provided, the liquid crystal display devices can be operated based on the principle of operation illustrated in FIG. 4.

Figure 6:
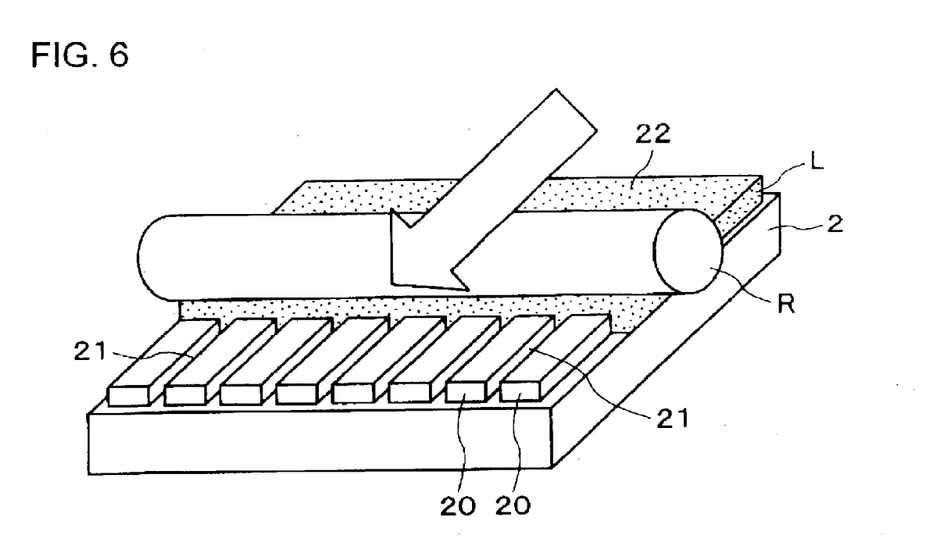
FIG. 6 is a schematic perspective view of a step in a first method of producing the liquid crystal display device of the present invention.

The first method of producing the liquid crystal display device of the present invention is carried out as follows. First, a lower substrate 2 formed of glass or transparent resin is provided. Then, a metallic material, such as Al or Ag, is deposited onto the lower substrate 2 to form a reflective layer 20 entirely on the lower substrate 2. After forming the reflective layer 20, openings 21 are formed through predetermined locations of the reflective layer 20 by photolithography, and needless portions of the reflective layer 20 at, for example, the peripheral portions of the substrate 2 are removed. Next, when the openings 21 have been formed, an inner polarizing layer 22 is formed so as to cover the reflective layer 20 and the openings 21. The inner polarizing layer 21 may be formed by, for example, the method illustrated in FIG. 6. In this method, an aqueous solution L of a water-soluble liquid crystal material consisting essentially of water-soluble dichromatic dye, that is, what are called lyotropic liquid crystals are applied to the reflective layer 20 and the openings 21 while exerting stress thereupon in a predetermined direction by a Meyer rod R or the like. Here, by making the direction of extension of the openings 21 and the direction of exerting stress upon the inner polarizing layer 22 the same (as indicated by the arrow shown in FIG. 6), an inner polarizing layer 22 having a polarization axis parallel to the direction of exerting stress can be formed. In other words, by making the sliding direction of the Meyer rod R and the direction of extension of the openings 21 the same during the application of the liquid crystals, the liquid crystal molecules of the inner polarizing layer 22 align themselves in the same direction as the direction of exerting stress, so that the inner polarizing layer 22 having a polarization axis that is parallel to the direction of exerting stress can be provided.

Next, after forming transparent electrodes 23 having stripe shapes in plan view on the inner polarizing layer 22, an alignment layer 24 is formed so as to cover the transparent electrodes 23, thereby defining the lower substrate 2. With the lower substrate 2 and a separately provided upper substrate 1 disposed in an opposing manner, the inner surfaces of peripheral ends of the substrates are sealed in by a sealant 5 having a substantially frame shape in plan view. Then, a space defined by the sealant 5 and both of the substrates 1 and 2 is filled with liquid crystals. As a result, a liquid crystal panel 1 is formed. Thereafter, a polarizer 19, a front diffuser 17, etc., are disposed at the outer surface of the liquid crystal panel, whereby the liquid crystal display device is produced. In this production method of the present invention, the transparent electrodes 23, the alignment layer 24, and the upper substrate 1 may be formed by steps of a related art method of producing a liquid crystal display device.

Next, the second method of producing the liquid crystal display device of the present invention is described below with reference to FIG. 7.

The second method differs from the first method in that an inner polarizing layer 22 is formed after forming an alignment layer 25 for the polarizing layer on a reflective layer 20 having openings 21. The steps of forming the reflective layer 20, electrodes 23, a polarizing layer 24, etc., on a lower substrate 2 are exactly the same.

As in the first method, the alignment layer 25 is formed at a lower substrate 2 (having the reflective layer 20 with the openings 21 formed thereon) so as to cover the openings 21 and the reflective layer 20 by applying polyimide or the like, and then rubbing a surface of the polyimide in the same direction as the direction of extension of the openings 21. This situation is shown in FIG. 7. The step of forming the alignment layer 25 for the polarizing layer is exactly the same as the step of forming an alignment layer used in an ordinary liquid crystal panel. Since the alignment layer 25 for the polarizing layer formed in this step is provided to control the alignment of the molecules of the material of the inner polarizing layer 22 that is formed next, the rubbing direction is the same as the direction of extension of the openings 21 of the reflective layer 20, that is, the same as the direction of the arrow shown in FIG. 7. By applying, for example, thermotropic polymer liquid crystals L containing a dichromatic dye to the alignment layer 25 for the polarizing layer rubbed using a spinner or the like up to a predetermined thickness, an inner polarizing layer 22 having a polarization axis parallel to the direction of extension of the openings 21 of the reflective layer 20 can be formed. The alignment of the liquid crystal molecules of the inner polarizing layer 22 formed in this way is controlled by the alignment layer 25 for the polarizing layer, so that it is possible to reduce or minimize the production of unaligned portions near the steps at the openings 21 of the reflective layer 20. Therefore, the liquid crystal display device has good polarization properties and little attenuation of light.

Although, in the first and second methods, the inner polarizing layer 22 is formed directly on the reflective layer 20 and its openings 21, an adherence layer may also be disposed between the inner polarizing layer 22 and the reflective layer 20 in the methods of the present invention.

The adherence layer is provided for firmly adhering the inner polarizing layer 22 to the reflective layer 20. It can be easily formed by applying, for example, a silane coupling agent or $SiO_2$ to the reflective layer 20 prior to forming the inner polarizing layer 22 or the alignment layer 25 for the polarizing layer.

Although, in the foregoing description, an aqueous solution of water-soluble liquid crystals is applied while exerting a stress thereupon by a Meyer rod or the like, it may be applied using other methods. Examples of other methods of applying an aqueous solution while exerting stress thereupon are the method of applying an aqueous solution while moving a roll and the substrate relative to each other at different speeds, and the method of applying an aqueous solution while ejecting liquid crystals in one direction from a fine nozzle.

Figure 7:
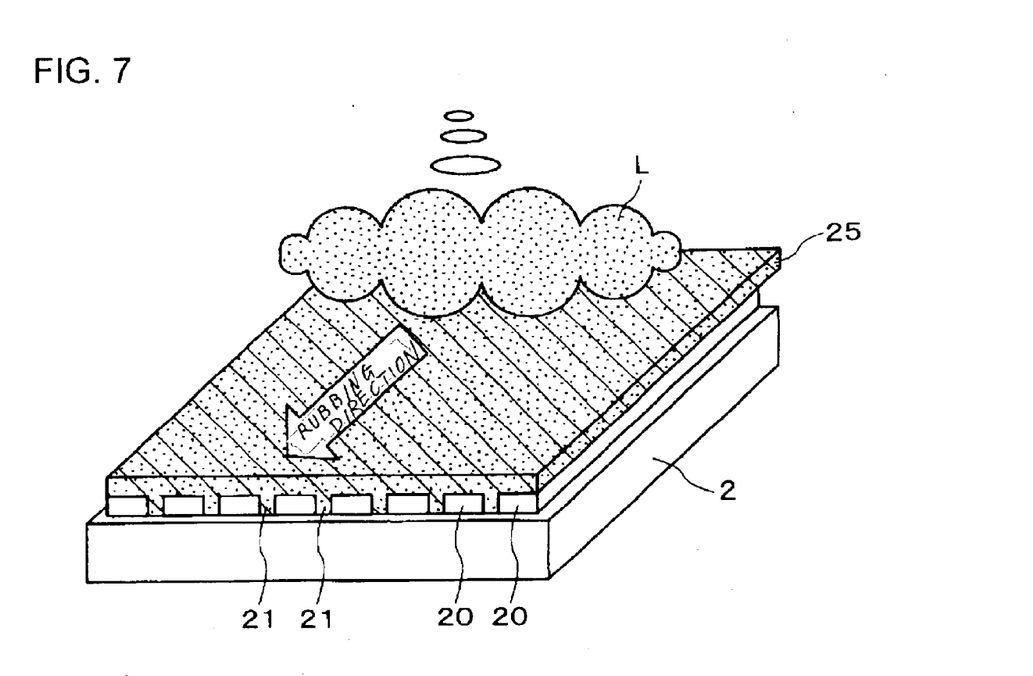
FIG. 7 is a schematic perspective view of a step in a second method of producing the liquid crystal display device of the present invention.

Although in the first and second methods illustrated in FIGS. 7 and 8, the inner polarizing layer 22 is formed on the reflective layer 20, the production methods of the present invention are not limited thereto, so that the inner polarizing layer 22 may be formed on the electrodes 23. In this case, after forming the electrodes 23 on the lower substrate 2, as in the first and second methods, the direction of exerting stress during application of the inner polarizing layer 22 or the direction of alignment in the alignment layer 25 for the polarizing layer is made the same as the direction of extension of the electrodes 23. An adherence layer, formed of a silane coupling agent, $SiO_2$, or the like, may be interposed between the electrodes 23 and the inner polarizing layer 22 or between the electrodes 23 and the alignment layer 25 for the polarizing layer. The adherence layer makes it possible to increase adherence between the electrodes 23 and the inner polarizing layer 22.

According to the production methods of the present invention, in forming the inner polarizing layer 22 on the electrodes or other thin layers, even if there are steps at an underlying layer thereof, the liquid crystal molecules of the inner polarizing layer 22 can be aligned in the same direction by applying the material of the inner polarizing layer 22 while applying a stress thereupon in the same direction as the longitudinal direction or the direction of extension of the steps. Therefore, the inner polarizing layer 22 can be formed in any portion of the liquid crystal panel 1.

[Electronic Apparatus]

Specific examples of an electronic apparatus including the liquid crystal device of the present invention are described below.

Figure 12:
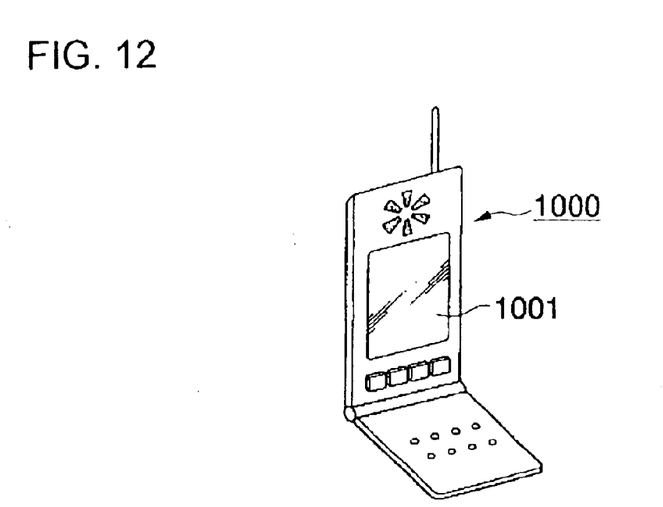
FIG. 12 is a schematic that illustrates an example of an electronic apparatus of the present invention.

FIG. 12 is a perspective view of a cellular phone.

In FIG. 12, reference numeral 1000 denotes the body of the cellular phone, and reference numeral 1001 denotes a liquid crystal display section using the above-described liquid crystal device.

Figure 13:
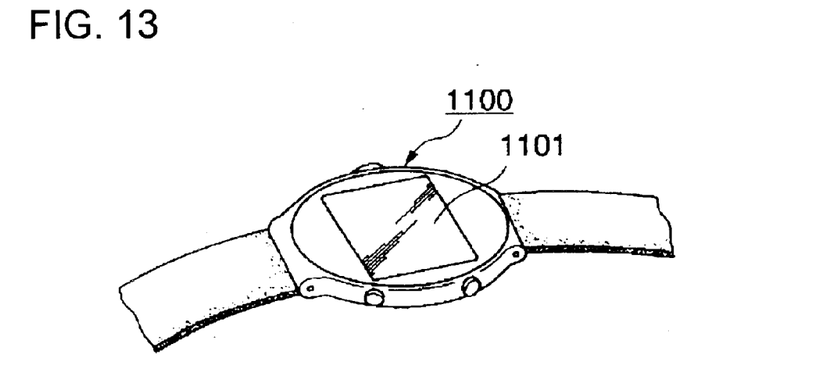
FIG. 13 is a schematic that illustrates another example of an electronic apparatus of the present invention.

FIG. 13 is a perspective view of a wristwatch.

In FIG. 13, reference numeral 1100 denotes the body of the wristwatch, and reference numeral 1101 denotes a liquid crystal display section using the above-described liquid crystal device.

Figure 14:
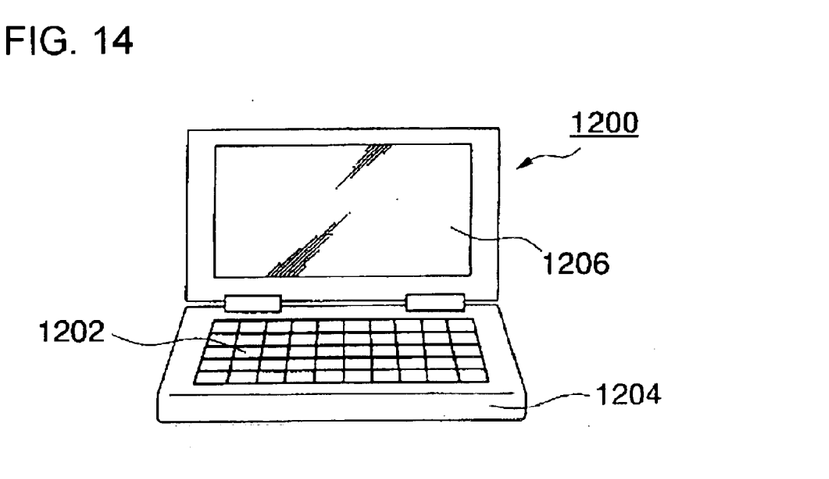
FIG. 14 is a schematic that illustrates still another example of an electronic apparatus of the present invention.

FIG. 14 is a perspective view of a portable information processor, such as a word processor or a personal computer.

In FIG. 14, reference numeral 1200 denotes the information processor, reference numeral 1202 denotes an input unit, such as a keyboard, reference numeral 1204 denotes the body of the information processor, and reference numeral 1206 denotes a liquid crystal display section using the above-described liquid crystal device.

The electronic apparatuses shown in FIGS. 12 to 14 include liquid crystal display sections that use the above-described liquid crystal device. Therefore, electronic apparatuses including a display section that provides a bright transmissive display can be provided.

[Advantages]

As described in detail above, according to the methods of producing a liquid crystal display device of the present invention, when the material of the inner polarizing layer is applied by exerting stress in one direction in the forming of the inner polarizing layer, the direction of exerting stress is substantially the same as the direction of extension of the openings of the reflective layer or the direction of extension of the electrodes. Therefore, it is possible to easily form an inner polarizing layer whose liquid crystal molecules at the peripheral portions of the steps are out of alignment to a small degree, has excellent polarization properties, and has little attenuation of light. Consequently, it is possible to easily produce a liquid crystal display device having excellent visibility.

The liquid crystal display device of the present invention includes an inner polarizing layer including liquid crystal molecules that are out of alignment to only a small degree. Therefore, attenuation of transmission light by the inner polarizing layer is reduced, so that luminance of a display in the transmission mode can be increased. As a result, it is possible to reduce differences between luminances in the reflection mode and the transmission mode, so that excellent visibility can be achieved.

What is claimed is:

1. A method of producing a liquid crystal display device that includes a liquid crystal layer disposed between a pair of opposing substrates and a plurality of pixel including a transmissive display area and a reflective display area, a reflective layer being disposed at the reflective display area and not the transmissive display area, the method comprising:

forming the reflective layer on one of the pair of substrates; and forming an inner polarizing layer which covers the reflective layer and the transmissive display area, the forming the inner polarizing layer including applying a material of the inner polarizing layer while exerting a stress thereupon in one direction, the direction of exerting the stress being substantially the same as the direction of extension of the transmissive display area.

2. A method of producing a liquid crystal display device that includes a liquid crystal layer disposed between a pair of opposing substrates and a plurality of pixels, each pixel including a transmissive display area, and a reflective display area, a reflective layer being disposed at the reflective display area and not the transmissive display area, the method comprising:

forming the reflective layer on one of the pair of substrates;

forming an alignment layer for an inner polarizing layer, the alignment layer covering the reflective layer and the transmissive display area; and forming the inner polarizing layer on the alignment layer;

the forming the alignment layer including forming the alignment layer so as to cover the reflective layer and the transmissive display area and so as to be aligned, the direction of performing the alignment operation being substantially the same as the direction of extension of the transmissive display area in order to apply the inner polarizing layer to the alignment layer.

3. A method of producing a liquid crystal display device that includes a liquid crystal layer disposed between a pair of opposing substrates, the method comprising:

forming a stripe-shaped electrode on one of the pair of substrates, the electrode being used to apply a voltage to the liquid crystal layer; and forming an inner polarizing layer which covers the electrode, the forming the inner polarizing layer including applying a material of the inner polarizing layer while exerting a stress thereupon in one direction, the direction of exerting the stress being substantially the same as the direction of extension of the electrode.

4. A method of producing a liquid crystal display device that includes a liquid crystal layer disposed between a pair of opposing substrates, the method comprising:

forming a stripe-shaped electrode on one of the pair of substrates, the electrode being used to apply a voltage directly to the liquid crystal layer;

forming an alignment layer for an inner polarizing layer, the alignment layer covering the electrode; and forming the inner polarizing layer on the alignment layer;

the forming the alignment layer including forming the alignment layer so as to cover the electrode and so as to be aligned, the direction of performing the alignment operation being substantially the same as the direction of extension of the electrode in order to apply the inner polarizing layer to the alignment layer.

5. A liquid crystal display device produced by the method of producing a liquid crystal display device of claim 1.

6. A liquid crystal display device, comprising:

a pair of opposing substrates;

a plurality of pixels, a liquid crystal layer disposed between the pair of opposing substrates and the plurality of pixels;

each pixel including a transmissive display area and a reflective display area;

a reflective layer disposed at one of the pair of substrates and at the reflective display area; and an inner polarizing layer which covers the reflective layer and the transmissive display area and which is formed of a material including a water-soluble dichromatic dye, an alignment direction in the inner polarizing layer being substantially the same as the direction of extension of the transmissive display area.

7. A liquid crystal display device, comprising:

a pair of opposing substrates;

a plurality of pixels;

a liquid crystal layer disposed between the pair of opposing substrates and the plurality of pixels;

each of pixels including a transmissive display area and a reflective display area;

a reflective layer disposed at one of the pair of substrates and at the reflective display area;

an inner polarizing layer formed of a material including polymer liquid crystals; and an alignment layer for the inner polarizing layer, the alignment layer covering the reflective layer and the transmissive display area, the alignment layer and the inner polarizing layer being successively stacked upon each other, the direction of performing an alignment operation on the alignment layer and the direction of extension of the transmissive display area being substantially the same.

8. A liquid crystal display device, comprising:

a pair of opposing substrates;

a liquid crystal layer disposed between the pair of opposing substrates;

a striped-shaped electrode, disposed on one of the pair of substrates, to apply a voltage to the liquid crystal layer;

a transmissive display area;

a reflective display area; and an inner polarizing layer formed of a material including a water-soluble dichromatic dye, an alignment direction in the inner polarizing layer and the direction of extension of the electrode being substantially the same.

9. A liquid crystal display device, comprising:

a pair of opposing substrates;

a liquid crystal layer disposed between the pair of opposing substrates;

a striped-shaped electrode, disposed on one of the pair of substrates, to apply a voltage to the liquid crystal layer;

a transmissive display area;

a reflective display area;

an inner polarizing layer formed of a material including polymer liquid crystals;

an alignment layer for the inner polarizing layer, the alignment layer and the inner polarizing layer being successively stacked on the electrode, the direction of performing an alignment operation on the alignment layer and the direction of extension of the electrode being substantially the same.

10. An electronic apparatus, comprising:

the liquid crystal display device of claim 5 usable as a display section.

* * * * *